(12) United States Patent
Yap et al.

(10) Patent No.: US 10,381,048 B2
(45) Date of Patent: Aug. 13, 2019

(54) DRIVE COVER WITH OVERMOLD FEATURES FOR CLAMP ASSEMBLY CONTACT

(71) Applicant: Seagate Technology LLC, Cupertino, CA (US)

(72) Inventors: Pow Ming Yap, Woodlands (SG); Ying Su, Punggol (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/808,838

(22) Filed: Nov. 9, 2017

(65) Prior Publication Data

US 2019/0139581 A1    May 9, 2019

(51) Int. Cl.
    *G11B 33/08*    (2006.01)
    *G11B 33/02*    (2006.01)
    *G11B 33/14*    (2006.01)

(52) U.S. Cl.
    CPC .......... *G11B 33/08* (2013.01); *G11B 33/027* (2013.01); *G11B 33/1446* (2013.01)

(58) Field of Classification Search
    None
    See application file for complete search history.

(56) References Cited

U.S. PATENT DOCUMENTS

| | | | |
|---|---|---|---|
| 4,071,862 A * | 1/1978 | Lathrop, Jr. et al. | G11B 23/0322 360/99.12 |
| 5,430,589 A * | 7/1995 | Moir et al. ......... | G11B 25/043 360/97.2 |
| 5,825,585 A * | 10/1998 | Hatam-Tabrizi ....... | G11B 33/08 360/98.07 |
| 6,300,695 B1 | 10/2001 | Neal | |
| 6,362,554 B1 | 3/2002 | Neal | |
| 6,437,464 B1 | 8/2002 | Neal | |
| 6,501,616 B1 | 12/2002 | Neal | |
| 6,617,721 B1 | 9/2003 | Neal | |
| 6,753,628 B1 | 6/2004 | Neal | |
| 6,848,168 B1 | 2/2005 | Slife et al. | |
| 6,889,424 B2 | 5/2005 | Slife et al. | |
| 7,049,715 B2 | 5/2006 | Neal | |
| 7,067,944 B2 | 6/2006 | Lieu et al. | |
| 7,154,200 B2 | 12/2006 | Neal | |
| 2006/0238914 A1* | 10/2006 | Xu .................. | G11B 33/08 360/97.19 |

\* cited by examiner

*Primary Examiner* — Craig A. Renner

(57) ABSTRACT

The apparatus includes a drive base, a drive cover overlying the drive base, wherein the drive cover comprises an opening therein, and wherein the drive cover is coupled to the drive base to enclose a media within an interior of the apparatus. A snubber is overmolded onto the drive cover. A clamp assembly contacts the snubber during shock events.

18 Claims, 16 Drawing Sheets

DRIVE COVER WITH OVERMOLD FEATURES FOR CLAMP ASSEMBLY CONTACT

SUMMARY

Provided herein is an apparatus that reduces damage to the media resulting from debris generation and/or particle dislodgement during shock events. The apparatus includes a drive base, a drive cover overlying the drive base, and a snubber overmolded onto the drive cover. The drive base and the drive cover encloses a media. The clamp assembly contacts the snubber during shock events. These and other features and advantages will be apparent from a reading of the following detailed description.

DESCRIPTION

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
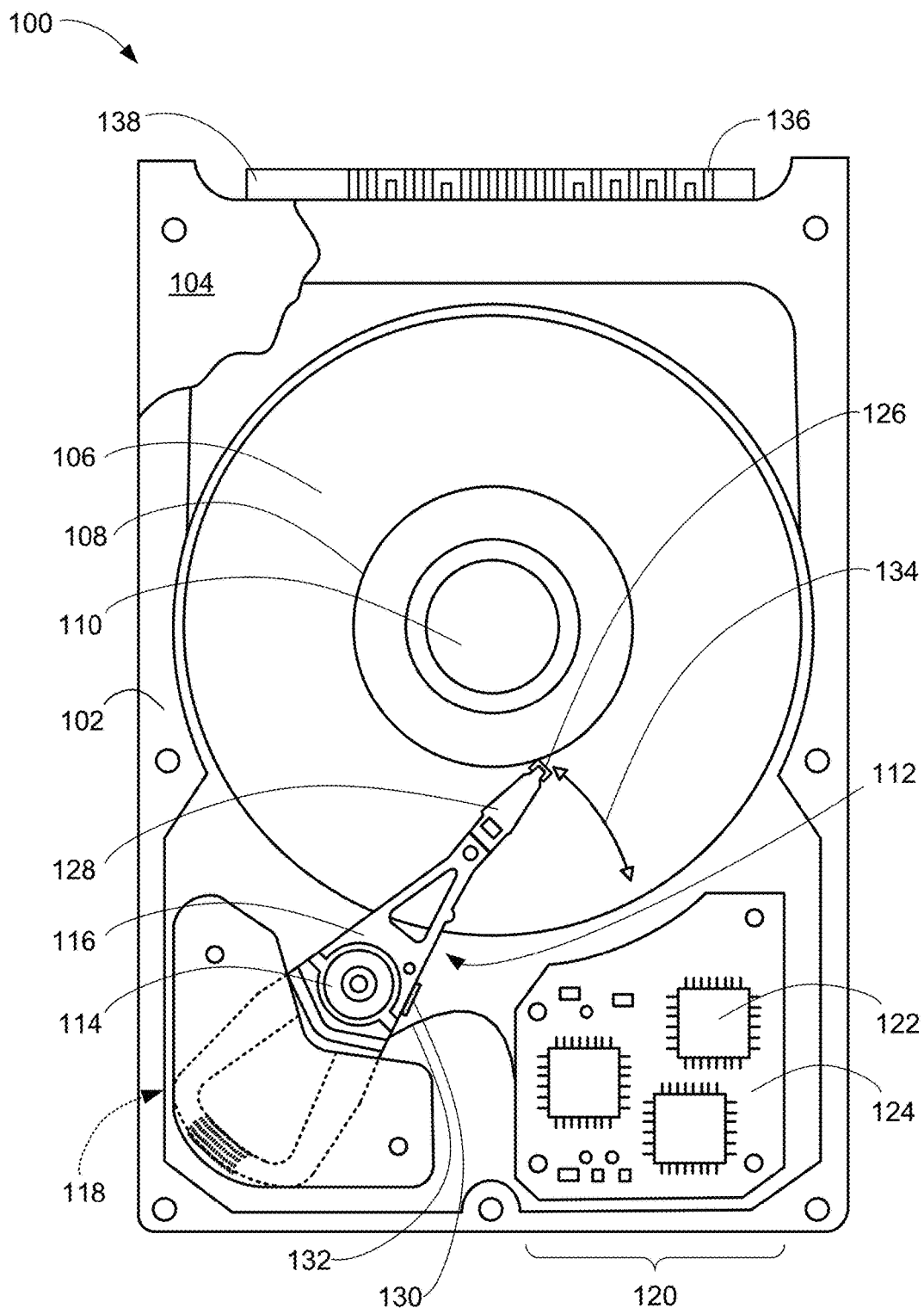
FIG. 1 shows an exemplary hard drive according to one aspect of the present embodiments.

FIG. 1 is a plan view of a data storage device in which a snubber described herein may be used. A disk drive 100 generally includes a base plate 102 and a cover 104 that may be disposed on the base plate 102 to define an enclosed housing for various disk drive components. The disk drive 100 includes one or more data storage disks 106 of computer-readable data storage media. Typically, both of the major surfaces of each data storage disk 106 include a plurality of concentrically disposed tracks for data storage purposes. Each data storage disk 106 is mounted on a hub 108, which in turn is rotatably interconnected with the base plate 102 and/or cover 104. Multiple data storage disks 106 are typically mounted in vertically spaced and parallel relation on the hub 108. A spindle motor 110 rotates the data storage disks 106.

The disk drive 100 also includes an actuator arm assembly 112 that pivots about a pivot bearing 114, which in turn is rotatably supported by the base plate 102 and/or cover 104. The actuator arm assembly 112 includes one or more individual rigid actuator arms 116 that extend out from near the pivot bearing 114. Multiple actuator arms 116 are typically disposed in vertically spaced relation, with one actuator arm 116 being provided for each major data storage surface of each data storage disk 106 of the disk drive 100. Other types of actuator arm assembly configurations could be utilized as well, an example being an "E" block having one or more rigid actuator arm tips, or the like, that cantilever from a common structure. Movement of the actuator arm assembly 112 is provided by an actuator arm drive assembly, such as a voice coil motor 118 or the like. The voice coil motor 118 is a magnetic assembly that controls the operation of the actuator arm assembly 112 under the direction of control electronics 120.

The control electronics 120 may include a plurality of integrated circuits 122 coupled to a printed circuit board 124. The control electronics 120 may be coupled to the voice coil motor assembly 118, a slider 126, or the spindle motor 110 using interconnects that can include pins, cables, or wires (not shown).

A load beam or suspension 128 is attached to the free end of each actuator arm 116 and cantilevers therefrom. Typically, the suspension 128 is biased generally toward its corresponding data storage disk 106 by a spring-like force. The slider 126 is disposed at or near the free end of each suspension 128. What is commonly referred to as the read/write head (e.g., transducer) is appropriately mounted as a head unit (not shown) under the slider 126 and is used in disk drive read/write operations. The head unit under the slider 126 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 126 is connected to a preamplifier 130, which is interconnected with the control electronics 120 of the disk drive 100 by a flex cable 132 that is typically mounted on the actuator arm assembly 112. Signals are exchanged between the head unit and its corresponding data storage disk 106 for disk drive read/write operations. In this regard, the voice coil motor 118 is utilized to pivot the actuator arm assembly 112 to simultaneously move the slider 126 along a path 134 and across the corresponding data storage disk 106 to position the head unit at the appropriate position on the data storage disk 106 for disk drive read/write operations.

When the disk drive 100 is not in operation, the actuator arm assembly 112 is pivoted to a "parked position" to dispose each slider 126 generally at or beyond a perimeter of its corresponding data storage disk 106, but in any case in vertically spaced relation to its corresponding data storage disk 106. In this regard, the disk drive 100 includes a ramp assembly (not shown) that is disposed beyond a perimeter of the data storage disk 106 to both move the corresponding slider 126 vertically away from its corresponding data storage disk 106 and to also exert somewhat of a retaining force on the actuator arm assembly 112.

Exposed contacts 136 of a drive connector 138 along a side end of the disk drive 100 may be used to provide connectivity between circuitry of the disk drive 100 and a next level of integration such as an interposer, a circuit board, a cable connector, or an electronic assembly. The drive connector 138 may include jumpers (not shown) or switches (not shown) that may be used to configure the disk drive 100 for user specific features or configurations. The jumpers or switches may be recessed and exposed from within the drive connector 138.

Unfortunately, due to small form factors, the top media 106 may contact the cover 104 during a shock event, e.g., during non-drive operation. When the media 106 contacts the cover 104, debris may be created and/or previously loose particles may be dislodged and fall onto the media 106, causing the media 106 to be damaged and scratched.

In order to control such contacts during shock events a stamped out snubber made from stainless steel on the cover 104 may be used. However, the stamped out stainless steel snubber causes hard particles and debris to be generated and dislodged during shock events. The head may be damaged by the hard particles and debris when the head moves from the non-data zone to data zone of the media 106. Furthermore, the debris and particles may be carried by the head and dropped into the data zone, damaging the media 106.

Some have developed the snubber that is integrated within cover 104 (e.g., stamped out), however, the material that the snubber is made of generates particle and/or debris that can damage the media significantly. Some have used Form In Place Gaskets (FIPG) as snubbers coupled to the cover 104. But FIPG may fall out over time due to wear and tear, extreme conditions, mishandling during drive assembly, etc. Moreover, hazing of media and outgassing are other considerations that may adversely impact the drive performance over time by using a snubber made from other material coupled to the cover 104. Accordingly, a need has arisen for a snubber that reduces or eliminates damage to the media resulting from particle/debris generation. Moreover, a need has arisen for a snubber that does not fall out over time and does not have outgassing concerns. According to some embodiments, snubber is made of polymers such as epoxy-based, elastomer materials, Teflon™, Polycarbonate, Polyoxymethylene, Polyetherimide, Polypropylene, etc. may be positioned, e.g., over molded, onto the cover 104. The snubber may be positioned on the cover 104 such that during shock event the outer diameter of the media 106 (non-data zone) contacts the snubber. Although, the snubber may produce particle/debris, but the material used is softer in comparison to metallic particles of the cover, and thus do not significantly damage the media. Moreover, use of over mold snubber in the cover 104 ensures that the snubber remains in place over time without falling out and addresses the outgassing concerns.

Furthermore, due to increasing demand for small form factor while increasing capacity in the drive technology, it has become much more challenging to have a drive where the cover 104 does not make contact with the disc clamp or disc clamp screw, e.g., during shock events. Debris/particles may be created when the disc clamp or disc clamp screw contacts the cover 104, e.g., during shock events. The debris/particles are generally hard material, e.g., stainless steel, nickel, nickel-phosphorous, etc., that may be dispersed by the head onto the media, which can damage the media, the head, other components, or any combination thereof. Accordingly, a need has arisen to address particle/debris generation when the disc clamp and/or disc clamp screw contact the cover 104 during shock events. Snubber may be positioned, e.g., over molded, to the cover 104 such that during shock events, the snubber on the cover 104 contacts the disc clamp or the disc clamp screw, therefore preventing major media damage resulting from any dislodgement of particles/debris.

Figure 2A:
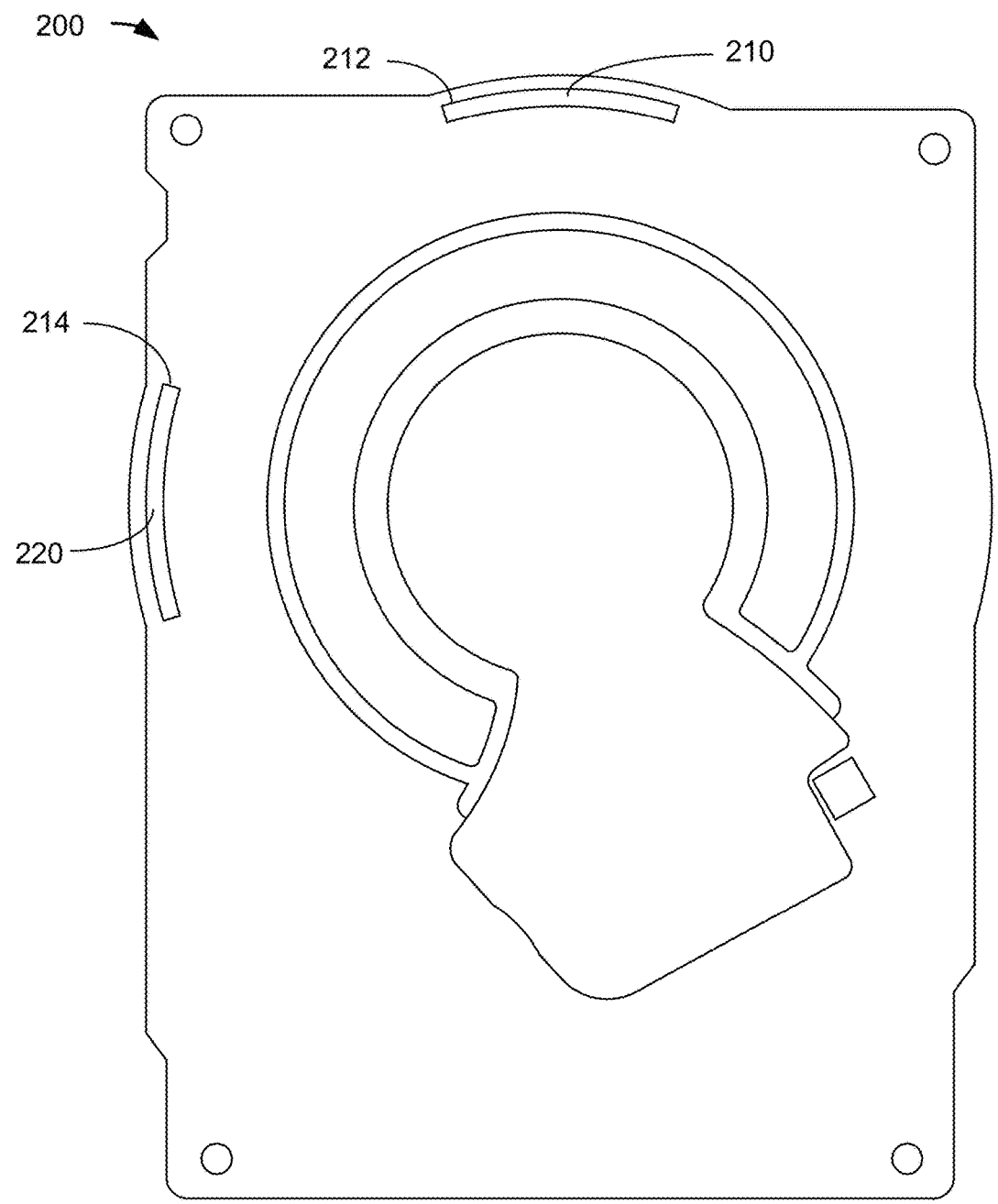
FIGS. 2A-2B show the drive cover according to one aspect of the present embodiments.
Figure 2B:
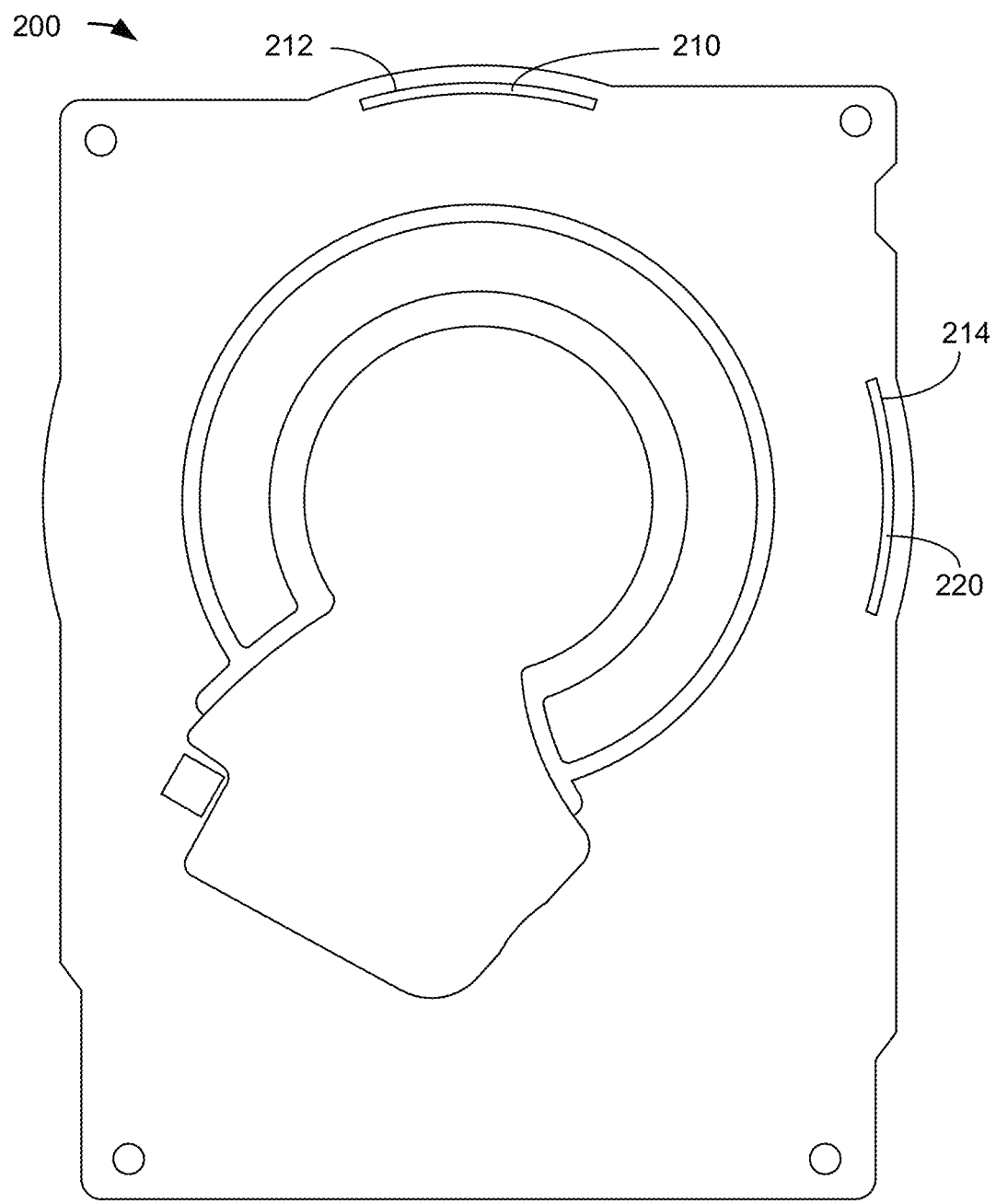

Referring now to FIGS. 2A-2B, the drive cover according to one aspect of the present embodiments is shown. More specifically referring to FIG. 2A, a top view of the drive cover 200 according to one aspect of the present embodiments is shown. The drive cover 200 may include openings 212 and 214. It is appreciated that the openings may be also referred to as holes interchangeably throughout this application. It is appreciated that the openings 212 and 214 may have any profile, e.g., curved, circular, square, elliptical, etc. and any length/width/diameter/radius, etc. In this embodiment, the openings 212 and 214 are curved. Furthermore, it is appreciated that the side walls of the openings 212 and 214 may slanted in some embodiments and not perpendicular out of plane. In other embodiments, the side walls of the openings 212 and 214 may have an uneven shape, e.g., curving in and out, zig-zag, etc.

The drive cover 200 further includes snubbers 210 and 220 that fill and overly the openings 212 and 214. In some embodiments, the snubbers 210 and 220 are overmolded to the drive cover 200. As such, in some embodiments, the snubbers 210 and 220 not only cover, from both top and bottom, the openings 212 and 214 but they may extend beyond the gap created by the openings 212 and 214. Moreover, it is appreciated that snubbers 210 and 220 may be manufactured from material including epoxy-based, elastomer materials, Teflon™, Polycarbonate, Polyoxymethylene, Polyetherimide, and Polypropylene, to name a few. As such, any impact between the media and the snubbers 210 and 220 does not damage the media in a major way that may have been resulted from debris creation and/or dislodgement of particles. It is appreciated that in some embodiments, the openings 212 and 214 and the snubbers 210 and 220 are positioned on the outer periphery of the drive cover 200 corresponding to the outer diameter of a media, e.g., non-data zone, inside the drive. As a result, at impact the non-data zone of the media and the snubbers 210 and 220 may contact one another instead of the data zone. Moreover, the snubbers 210 and 220 do not fall out overtime because they are overmolded to the drive cover 200.

Referring now to FIG. 2B, the bottom view of the drive cover 200 according to one aspect of the present embodiments is shown. It is appreciated that the extension of the snubber 210 beyond the opening 212 may be different on top and bottom. For example, in some embodiments, the snubber 210 may extend beyond the opening 212 more on top of the drive cover than the bottom. Similarly, it is appreciated that the extension of the snubber 220 beyond the opening 214 may be different on top and bottom. For example, in some embodiments, the snubber 220 may extend beyond the opening 214 more on top of the drive cover than the bottom.

Figure 3:
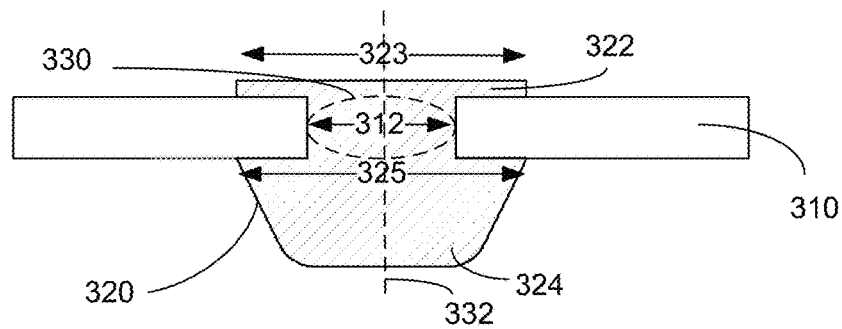
FIG. 3 shows a side view of the drive cover of FIGS. 2A-2B according to one aspect of the present embodiments.

Referring now to FIG. 3, a side view of the drive cover of FIGS. 2A-2B according to one aspect of the present embodiments is shown. The drive cover 310 may be similar to that of FIGS. 2A-2B. In this embodiment, the drive cover 310 includes an opening 330. The snubber 320 may be similar to that of FIGS. 2A-2B and is positioned within the opening of the drive cover 310. In some embodiments, the snubber 320 may have two portions and may be overmolded to the drive cover 310. Accordingly, the snubber 320 does not fall out over time because it is overmolded to the drive cover 310.

The first portion 322 of the snubber 320 may be positioned above the drive cover 310 facing the external environment of the drive and a second portion 324 of the snubber 320 may be positioned below the drive cover 310 facing the internal enclosure of the drive. During shock events, the media may contact the second portion 324 of the snubber 320. In some embodiments, the length 323 of the first portion 322 of the snubber 320 may be greater than the gap 312 of the drive cover 310. Similarly, in some embodiments the length 325 of the second portion 324 of the snubber 320 may be greater than the gap 312 of the drive cover 310. It is appreciated that in some embodiments, the lengths 323 and 325 may be the same and in other embodiments the lengths may be different from one another. Furthermore, it is appreciated that in some embodiments, the snubber 320 may be symmetrical with respect to the axis 332 of the opening of the drive cover 310. However, it is appreciated that in some embodiments, the snubber 320 may by asymmetrical with respect to the axis 332 of the opening of the drive cover 310.

Figure 4A:
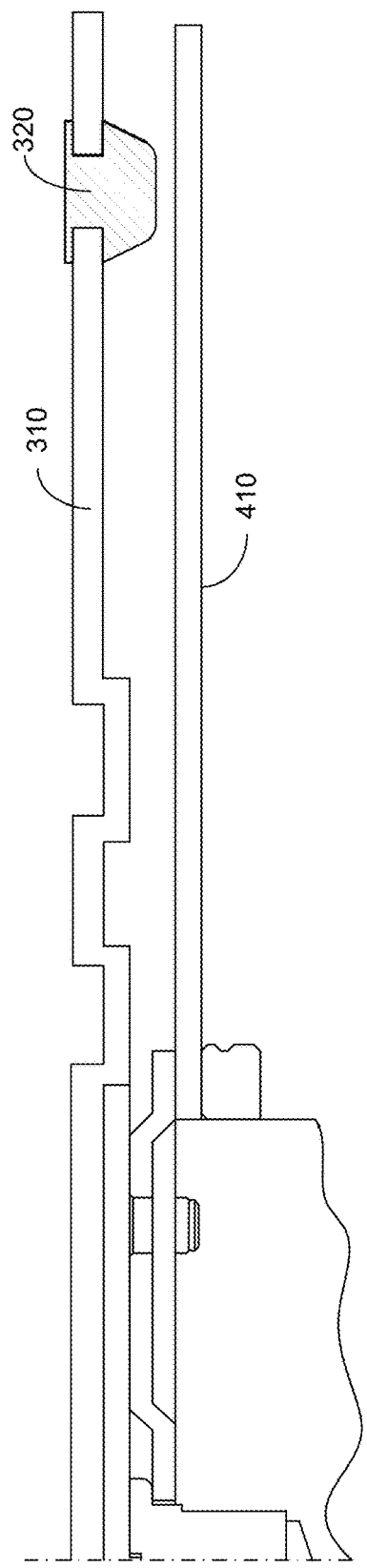
FIGS. 4A-4B show the drive before and during shock event according to one aspect of the present embodiments.
Figure 4B:
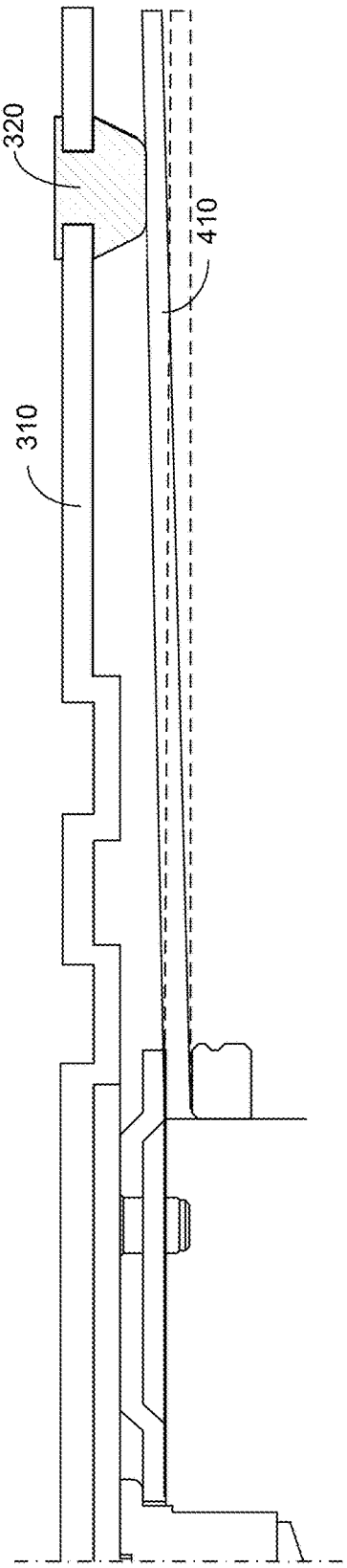

Referring now to FIGS. 4A-4B, the drive before and during shock event according to one aspect of the present embodiments is shown. Referring more specifically to FIG. 4A, the drive cover 310 and the snubber 320 prior to shock event is shown. As illustrated, the media 410 is undeflected and does not contact the snubber 320 or the drive cover 310. Referring now to FIG. 4B, the drive cover 310 and the snubber 320 during shock event is shown. The media 410 contacts the snubber 320 during shock event. More specifically, in some embodiments, the media 410 contacts the second portion 324 of the snubber 320 during shock event. As shown, the outer diameter of the media 410, e.g., non-data zone, contacts the snubber 320. Accordingly, any debris created or any particles dislodged does not damage the media in a major way due to the impact because the snubber 320 comprises material including epoxy-based, elastomer materials, Teflon, Polycarbonate, Polyoxymethylene, Polyetherimide, or Polypropylene, to name a few.

Figure 5:
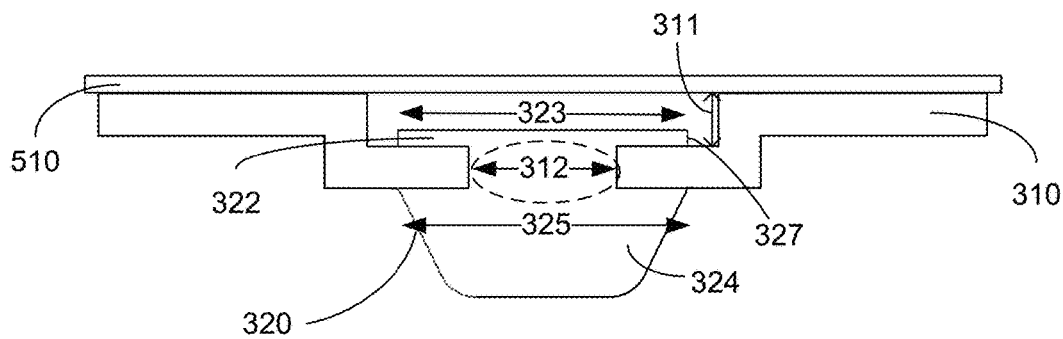
FIGS. 5-7 show a drive cover with a seal according to one aspect of the present embodiments.
Figure 6:
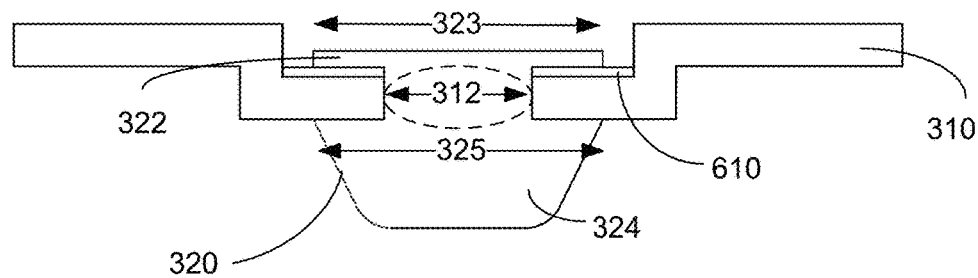
Figure 7:
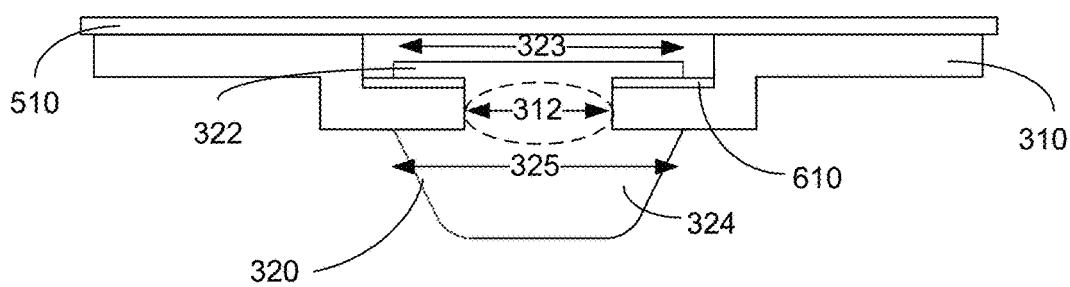

Referring now to FIGS. 5-7, a drive cover with a seal according to one aspect of the present embodiments is shown. Referring more specifically to FIG. 5, a stair shaped drive cover 310 is shown. The opening 322 may be positioned at the lower portion of the drive cover 310, as illustrated. The snubber 320 may be positioned within the opening 330 and cover the opening 330. In some embodiments, the snubber 320 may include two portions 322 and 324. The height 327 of the first portion 322 may be smaller than the height 311 of the drive cover 310. It is appreciated that in some embodiments the height 327 of the first portion 322 may be the same as the height 311 of the drive cover 310. It is appreciated that in some embodiments, a seal 510 may be deposited over a portion of the top surface of the drive cover 310. The seal 510 may contact the upper surface of the drive 310. It is appreciated that the seal 510 may overlie the first portion 322 of the snubber 320 and encapsulates the first portion 322 of the snubber 320 between the seal 510 and the drive cover 310. As such, any leak from the interior of the drive to the external environment may be prevented. It is appreciated that in some embodiments the seal 510 may contact the upper surface of the drive cover 310 in certain locations while it remains contactless with the first portion 322 snubber 320. However, it is appreciated that the seal 510 may contact the upper surface of the first portion 322 of the snubber 320 in some embodiments.

It is appreciated that in some embodiments, the lower surface of the first portion 322 may be in direct contact with the upper surface of the drive cover 310. Moreover, it is appreciated that in some embodiments, the upper surface of the second portion 324 may be in direct contact with the lower surface of the drive cover 310. It is appreciated that the sidewalls of the first portion 322 may not contact the sidewalls of the drive cover 310 in some embodiments. However, it is appreciated that contactless sidewalls, as shown, are for illustrative purposes only and should not be construed as limiting the scope of the embodiments. For example, the sidewalls of the first portion 322 may contact the sidewalls of the drive cover 310 in some embodiments.

In some embodiments, the first portion 322 and the second portion 324 of the snubber 320 may be asymmetrical with respect to one another. However, it is appreciated that the asymmetrical first portion 322 and second portion 324 of the snubber 320 is for illustrative purposes only and should not be construed as limiting the scope of the embodiments. For example, the first portion 322 and the second portion 324 of the snubber 320 may be symmetrical with respect to one another in some embodiments.

According to some embodiments, the width 323 of the first portion 322 of the snubber 320 is greater than the gap 312 of the opening 330. It is appreciated that the width 325 of the second portion 324 of the snubber 320 is also greater than the gap 312 of the opening 330. In other words, the snubber 320 is overmolded to the drive cover 310 over the opening 330. Accordingly, the snubber 320 does not fall out overtime because it is overmolded to the drive cover 310. In some embodiments, the width 323 of the first portion 322 may be smaller than the width 325 of the second portion 324. However, it is appreciated that the widths 323 and 325, as shown, are for illustrative purposes only and should not be construed as limiting the embodiments. For example, in some embodiments the width 323 of the snubber 320 may be greater than the width 325 of the snubber 320 and in other embodiments they may be equal to one another.

Referring now to FIG. 6, an embodiment similar to that described in FIG. 5 is shown. However, in this embodiment, instead of depositing the seal 510 on the upper surface of the drive cover 310 to overlie that the first portion 322 of the snubber 320, the seal 610 is applied at the bottom surface of the first portion 322 of the snubber 320 that contacts the upper surface of the drive cover 310. In other words, the seal 610 is sandwiched between the lower surface of the first portion 322 of snubber 320 and the upper surface of the drive cover 310.

Referring now to FIG. 7, an embodiment that is a combination of the embodiments shown in FIGS. 5 and 6 is shown. In this embodiment, both seals 510 and 610 are used. As such, any leakage from the interior enclosure of the drive to the exterior of the drive is prevented.

Figure 8A:
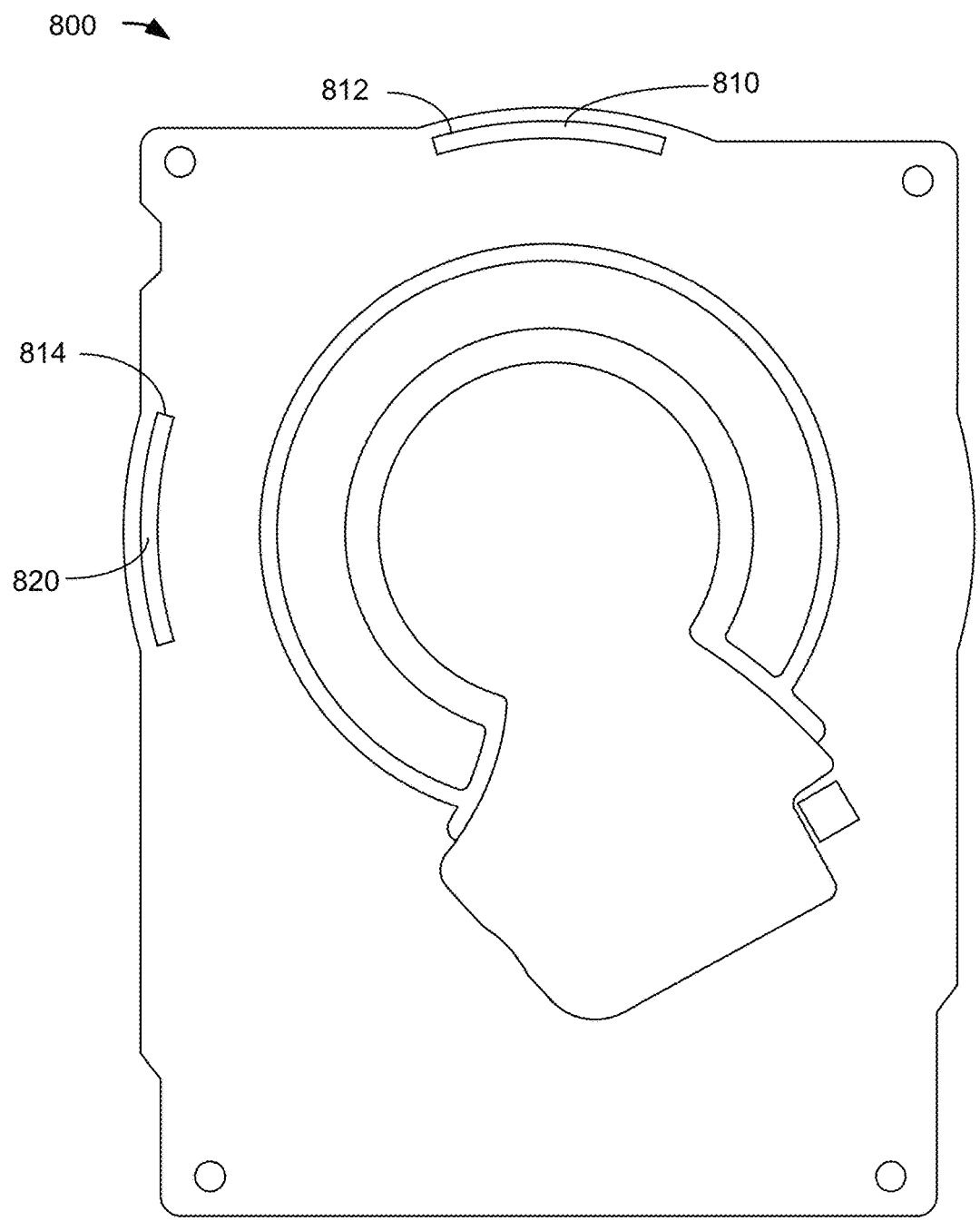
FIGS. 8A-8B show a drive cover with yet another profile according to one aspect of the present embodiments.
Figure 8B:
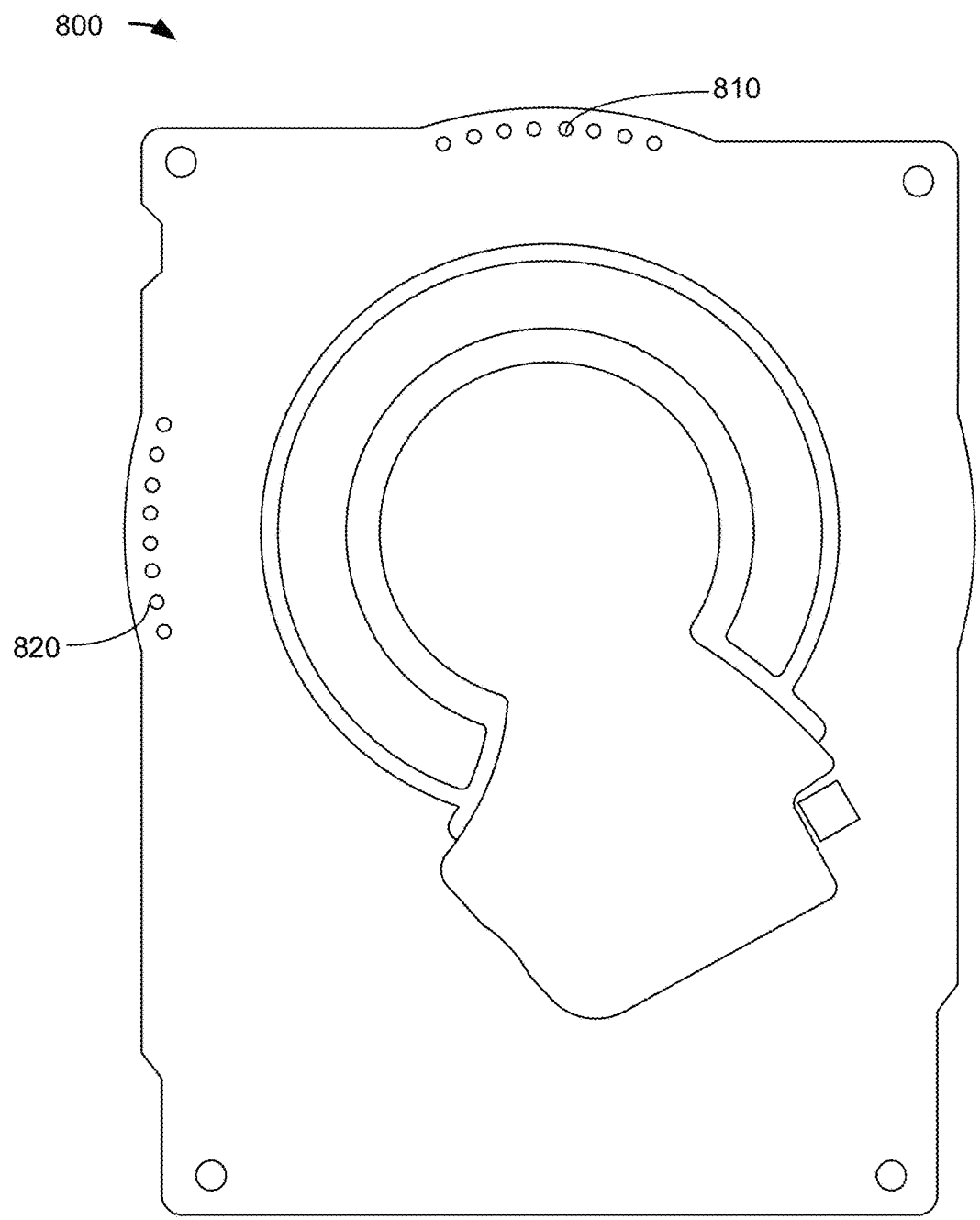
Figure 9A:
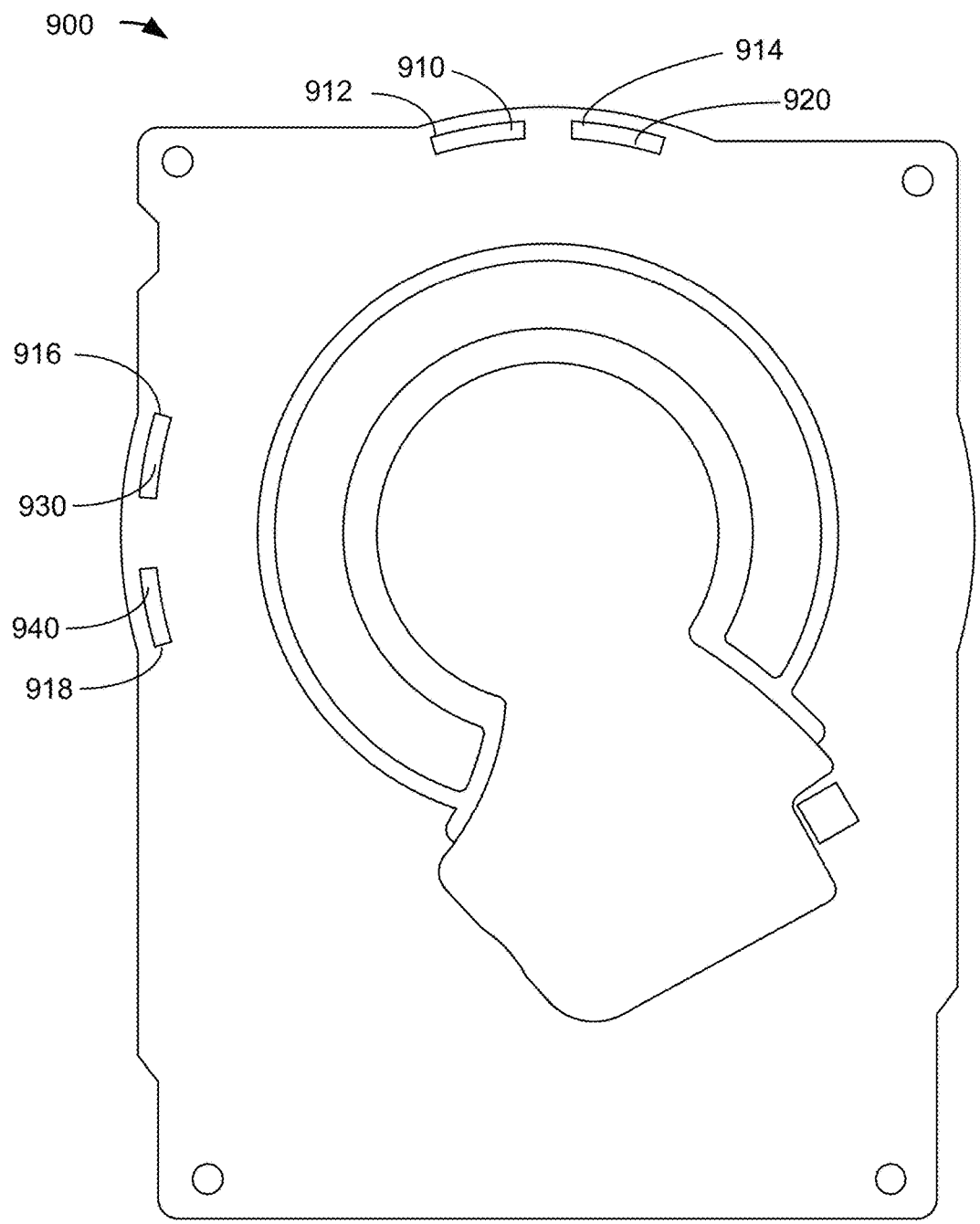
FIGS. 9A-9B show yet another drive cover with an alternate profile according to one aspect of the resent embodiments.
Figure 9B:
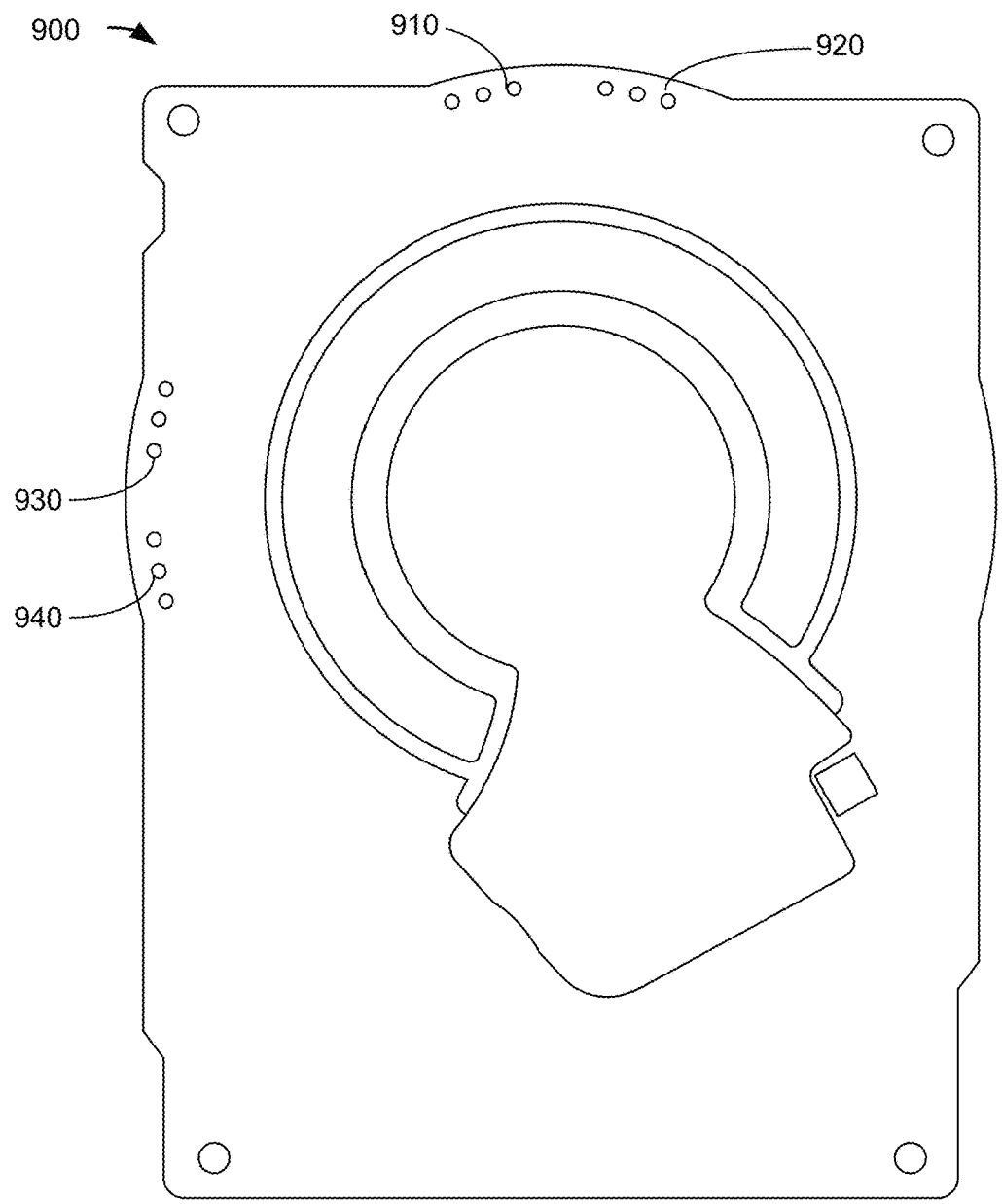

Referring now to FIGS. 8A-8B, a top and bottom view of a drive cover 800 with yet another profile according to one aspect of the present embodiments is shown. The drive cover includes openings 812 and 814 and snubbers 810 and 820. It is appreciated that the openings 812 and 814 and the snubbers 810 and 820 are similar to those described above. Referring now to FIGS. 9A-9B, yet another top and bottom view of the drive cover 900 with alternate profile according to one aspect of the resent embodiments is shown. The drive cover includes openings 912, 914, 916, and 918 and snubbers 910, 920, 930, and 940. It is appreciated that the openings 912, 914, 916, and 918 and the snubbers 910, 920, 930, and 940 are similar to those described above.

Figure 10:
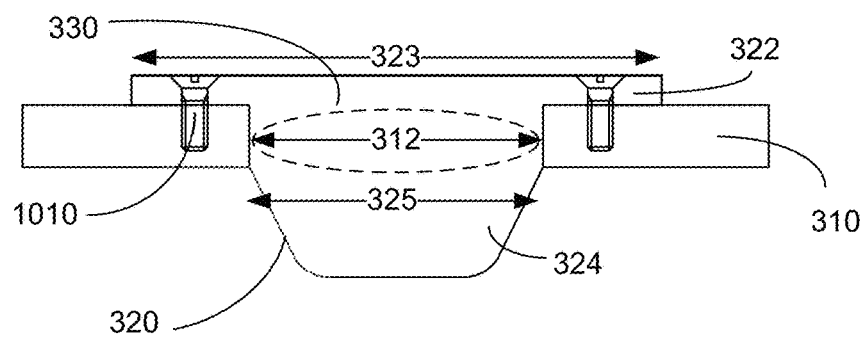
FIG. 10 shows a drive cover according to an alternate aspect of the present embodiments.

Referring now to FIG. 10, a drive cover according to an alternate aspect of the present embodiments is shown. In this embodiment, the width 323 of the first portion 322 of the snubber 320 is greater than the width 312 of the opening 330. However, the width 325 of the second portion 324 of the snubber 320 may be the same as the width 312 of the opening 330. The first portion 322 of the snubber 320 may therefore be secured to the drive cover 310 using a fastener 1010, e.g., glue, screws, etc. In other words, in some embodiments, the snubber 320 may be secured without falling out overtime by using a fastener instead of the overmolding process.

FIGS. 11A-18 are directed to use of the snubber similar to that described in FIGS. 1-10 above, but for clamp assembly, e.g., disc clamp, disc clamp screw, etc. In other words, a snubber similar to that described in FIGS. 1A-10 may be positioned to contact the clamp assembly during shock events in order to prevent major damage to the media resulting from debris generation or dislodgement of particles.

Figure 11A:
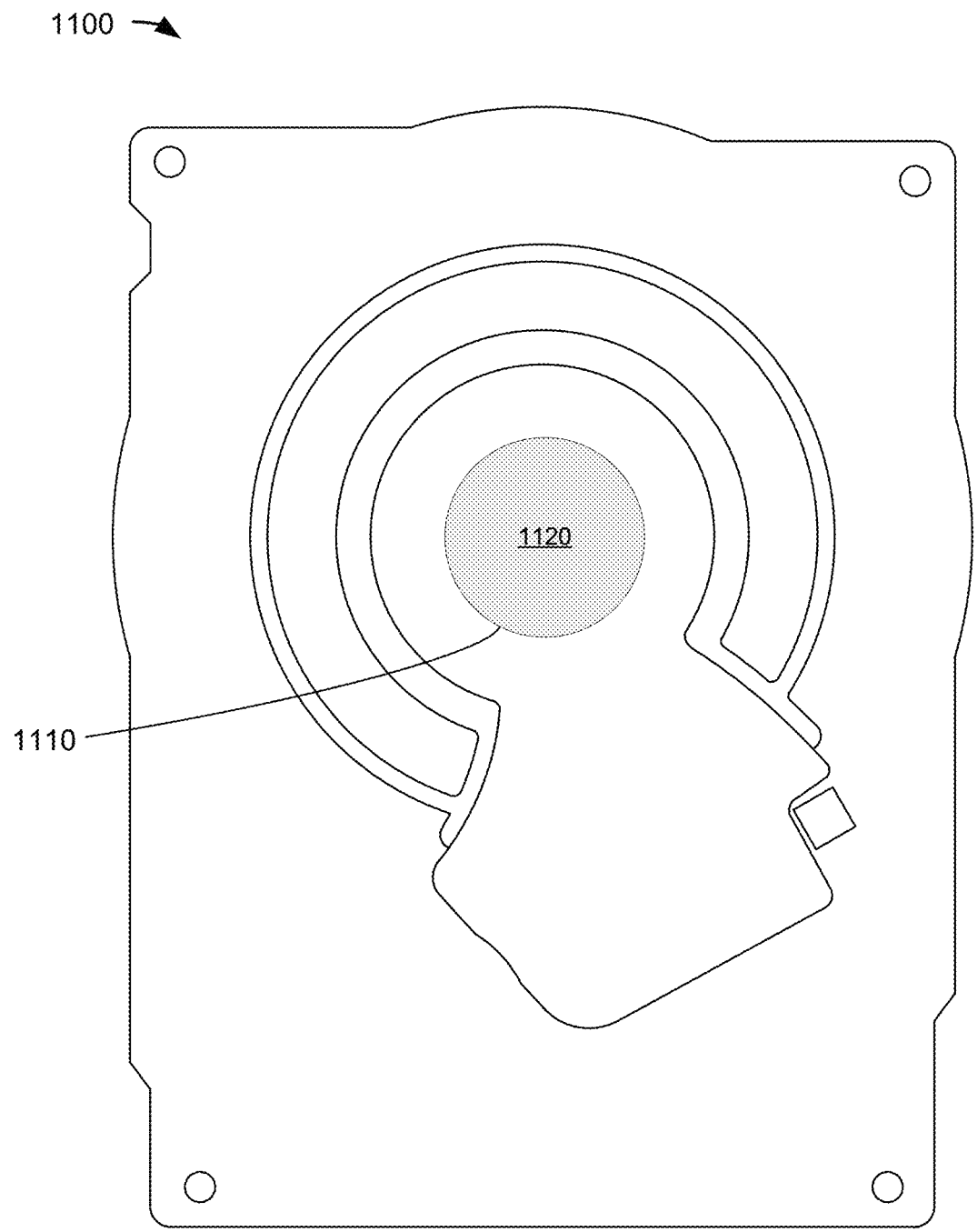
FIGS. 11A-11B show yet another drive cover according to one aspect of the present embodiments.
Figure 11B:
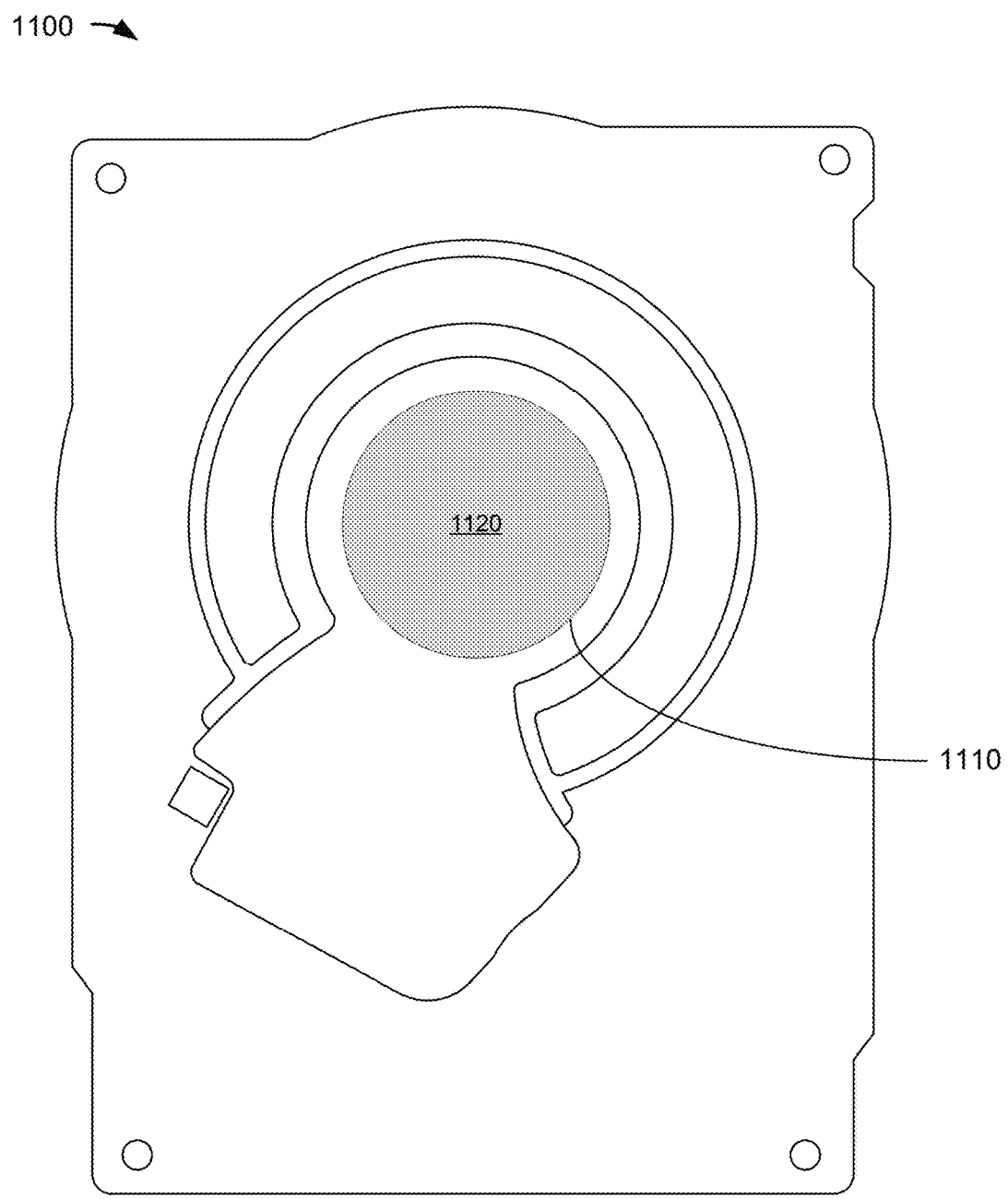

Referring now to FIGS. 11A-11B, yet another drive cover according to one aspect of the present embodiments is shown. Referring to FIG. 11A, a top view of the drive cover 1100 is shown. The drive cover 1100 includes an opening 1110 and a snubber 1120. The opening 1110 may be similar to the opening, as described above with respect to FIGS. 1-10, but it may be positioned close to the center of the drive cover 1100 where the clamp assembly resides. The snubber 1120 may be similar to the snubber described above with respect to FIGS. 1-10 and it may cover the opening 1110. FIG. 11B shows a bottom view of the drive cover 1100 in accordance with some embodiments.

Figure 12:
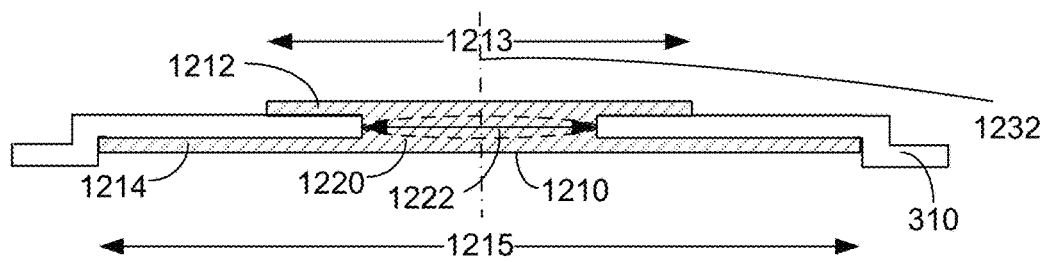
FIG. 12 shows a side view of the drive cover of FIGS. 11A-11B according to one aspect of the present embodiments.

Referring now to FIG. 12, a side view of the drive cover of FIGS. 11A-11B according to one aspect of the present embodiments is shown. The drive cover 310 may be similar to that of FIGS. 11A-11B. In this embodiment, the drive cover 310 includes an opening 1220. The snubber 1210 may be similar to that of FIGS. 11A-11B and is positioned within the opening 1220 of the drive cover 310. In some embodiments, the snubber 1210 may have two portions and may be overmolded to the drive cover 310. Accordingly, the snubber 1210 does not fall out overtime because it is overmolded to the drive cover 310.

The first portion 1212 of the snubber 1210 may be positioned above the drive cover 310 facing the external environment of the drive and a second portion 1214 of the snubber 1210 may be positioned below the drive cover 310 facing the internal enclosure of the drive. During shock events, the clamp assembly, e.g., disc clamp, disc clamp screw, etc., may contact the second portion 1214 of the snubber 1210. In some embodiments, the length 1213 of the first portion 1212 of the snubber 1210 may be greater than the gap 1222 of the opening 1220 of the drive cover 310. Similarly, in some embodiments the length 1215 of the second portion 1214 of the snubber 1210 may be greater than the gap 1222 of the drive cover 310. It is appreciated that in some embodiments, the lengths 1213 and 1215 may be the same and in other embodiments the lengths may be different from one another. Furthermore, it is appreciated that in some embodiments, the snubber 1210 may be symmetrical with respect to the axis 1232 of the opening 1220 of the drive cover 310. However, it is appreciated that in some embodiments, the snubber 1210 may by asymmetrical with respect to the axis 1232 of the opening 1220 of the drive cover 310.

Figure 13A:
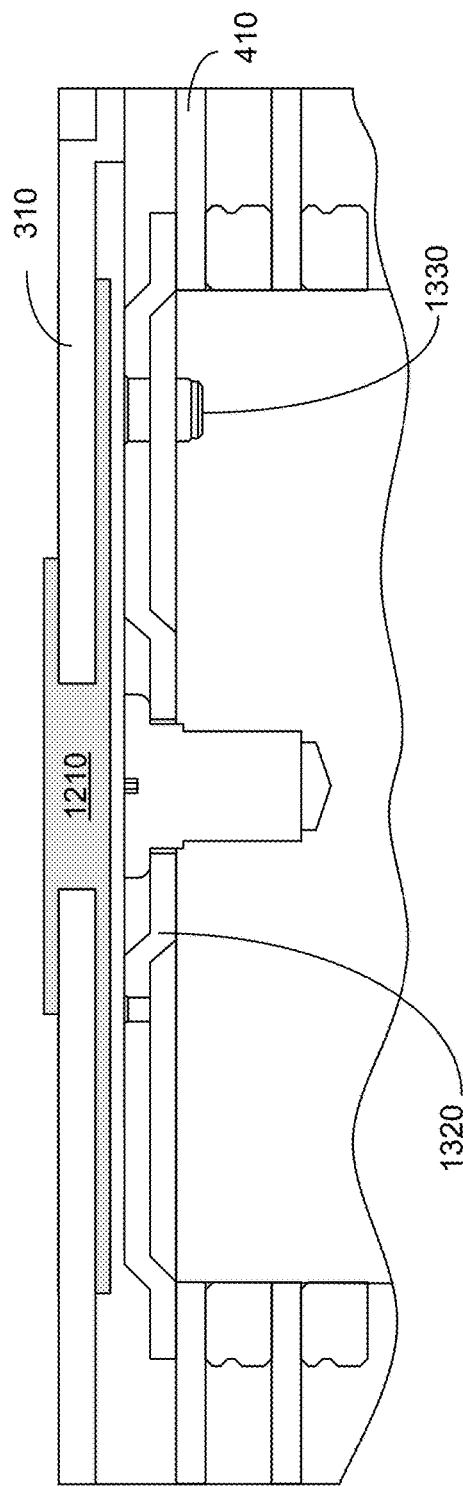
FIGS. 13A-13B show the drive before and during shock event according to one aspect of the present embodiments.
Figure 13B:
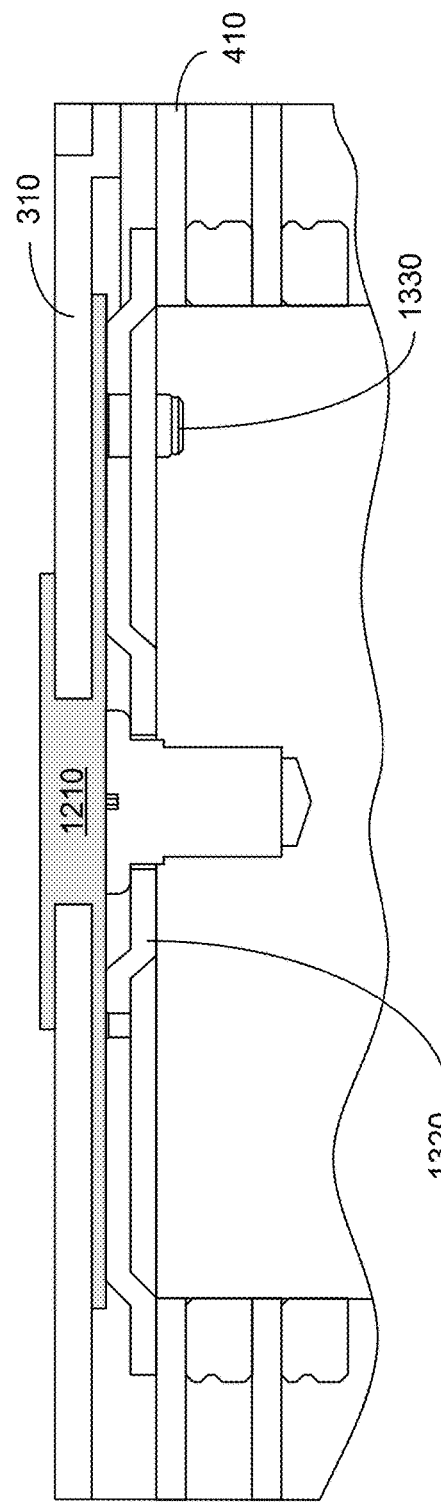

Referring now to FIGS. 13A-13B, the drive before and during shock event according to one aspect of the present embodiments is shown. Referring more specifically to FIG. 13A, the drive cover 310 and the snubber 1210 prior to shock event is shown. As illustrated, the disc clamp 1320 and the disc clamp screw 1330 do not contact the snubber 1210 or the drive cover 310. Referring now to FIG. 13B, the drive cover 310 and the snubber 1210 during shock event is shown. The disc clamp 1320 and/or the disc clamp screw 1330 contact the snubber 1210 during shock event. More specifically, in some embodiments, the disc clamp 1320 and/or the disc clamp screw 1330 contact the second portion 1214 of the snubber 1210 during shock event. Accordingly, any major media damage resulting from debris created or any particles dislodgement due to the impact is prevented because the snubber 1210 comprises material including epoxy-based, elastomer materials, Teflon™, Polycarbonate, Polyoxymethylene, Polyetherimide, or Polypropylene, to name a few.

Figure 14:
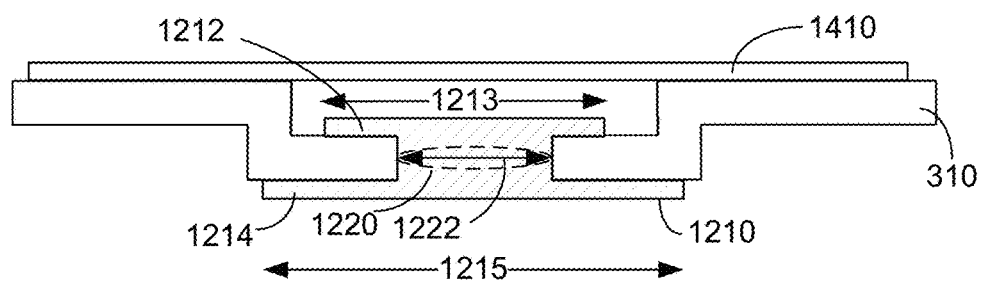
FIGS. 14-16 show a drive cover with a seal according to one aspect of the present embodiments.
Figure 15:
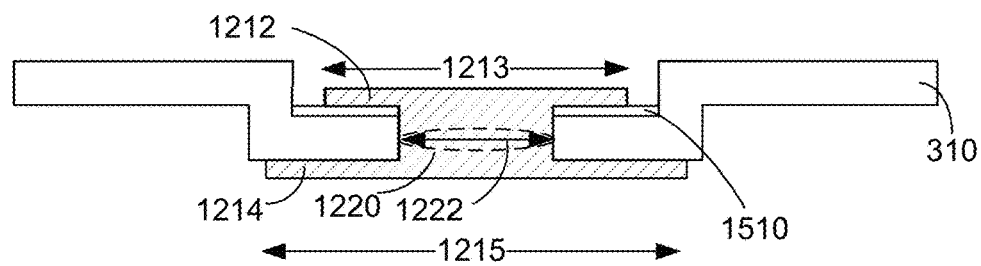
Figure 16:
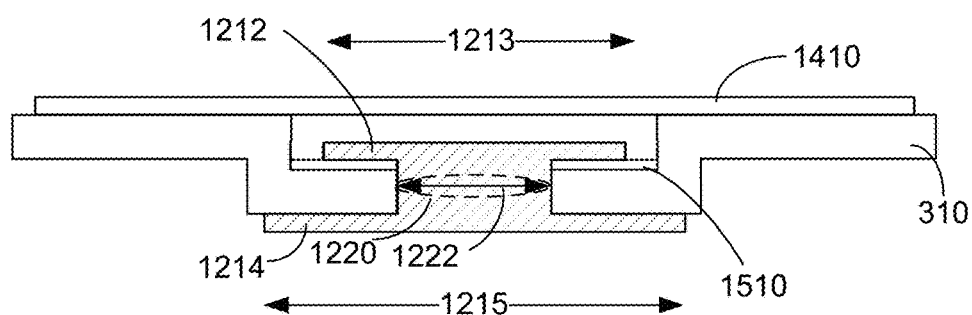

Referring now to FIGS. 14-16, a drive cover with a seal according to one aspect of the present embodiments is shown. Referring more specifically to FIG. 15, a stair shaped drive cover 310 is shown. The opening 1220 may be positioned at the lower portion of the drive cover 310, as illustrated. The snubber 1210 may be positioned within the opening 1220 and cover the opening 1220. In some embodiments, the snubber 1210 may include two portions 1212 and 1214. The height of the first portion 1212 may be smaller than the height of the drive cover 310. It is appreciated that in some embodiments the height of the first portion 1212 may be the same as the height of the drive cover 310. It is appreciated that in some embodiments, a seal 1410 may be similar to seal 510 and it may be deposited over a portion of the top surface of the drive cover 310. The seal 1410 may contact the upper surface of the drive cover 310. It is appreciated that the seal 1410 may overlie the first portion 1212 of the snubber 1210 and encapsulates the first portion 1212 of the snubber 1210 between the seal 1410 and the drive cover 310. As such, any leak from the interior of the drive to the external environment may be prevented. It is appreciated that in some embodiments the seal 1410 may contact the upper surface of the drive cover 310 in certain locations while it remains contactless with the first portion 1212 snubber 1210. However, it is appreciated that the seal 1410 may contact the upper surface of the first portion 1212 of the snubber 1210 in some embodiments.

It is appreciated that in some embodiments, the lower surface of the first portion 1212 may be in direct contact with the upper surface of the drive cover 310. Moreover, it is appreciated that in some embodiments, the upper surface of the second portion 1214 may be in direct contact with the lower surface of the drive cover 310. It is appreciated that the sidewalls of the first portion 1212 may not contact the sidewalls of the drive cover 310 in some embodiments. However, it is appreciated that contactless sidewalls, as shown, are for illustrative purposes only and should not be construed as limiting the scope of the embodiments. For example, the sidewalls of the first portion 1212 may contact the sidewalls of the drive cover 310 in some embodiments.

In some embodiments, the first portion 1212 and the second portion 1214 of the snubber 1210 may be asymmetrical with respect to one another. However, it is appreciated that the asymmetrical first portion 1212 and second portion 1214 of the snubber 1210 is for illustrative purposes only and should not be construed as limiting the scope of the embodiments. For example, the first portion 1212 and the second portion 1214 of the snubber 1210 may be symmetrical with respect to one another in some embodiments.

According to some embodiments, the width 1213 of the first portion 1212 of the snubber 1210 is greater than the gap 1222 of the opening 1220. It is appreciated that the width 1215 of the second portion 1214 of the snubber 1210 is also greater than the gap 1222 of the opening 1220. In other words, the snubber 1210 is overmolded to the drive cover 310 over the opening 1220. Accordingly, the snubber 1210 does not fall out overtime because it is overmolded to the drive cover 310. In some embodiments, the width 1213 of the first portion 1212 may be smaller than the width 1215 of the second portion 1214. However, it is appreciated that the widths 1213 and 1215, as shown, are for illustrative purposes only and should not be construed as limiting the embodiments. For example, in some embodiments the width 1213 of the snubber 1210 may be greater than the width 1215 of the snubber 1210 and in other embodiments they may be equal to one another.

Referring now to FIG. 15, an embodiment similar to that described in FIG. 14 is shown. However, in this embodiment, instead of depositing the seal 1410 on the upper surface of the drive cover 310 to overlie that the first portion 1212 of the snubber 1210, the seal 1510 is applied at the bottom surface of the first portion 1212 of the snubber 1210 that contacts the upper surface of the drive cover 310. In other words, the seal 1510 is sandwiched between the lower surface of the first portion 1212 of snubber 1210 and the upper surface of the drive cover 310.

Referring now to FIG. 16, an embodiment that is a combination of the embodiments shown in FIGS. 14 and 15 is shown. In this embodiment, both seals 1410 and 1510 are used. As such, any leakage from the interior enclosure of the drive to the exterior of the drive is prevented.

Figure 17A:
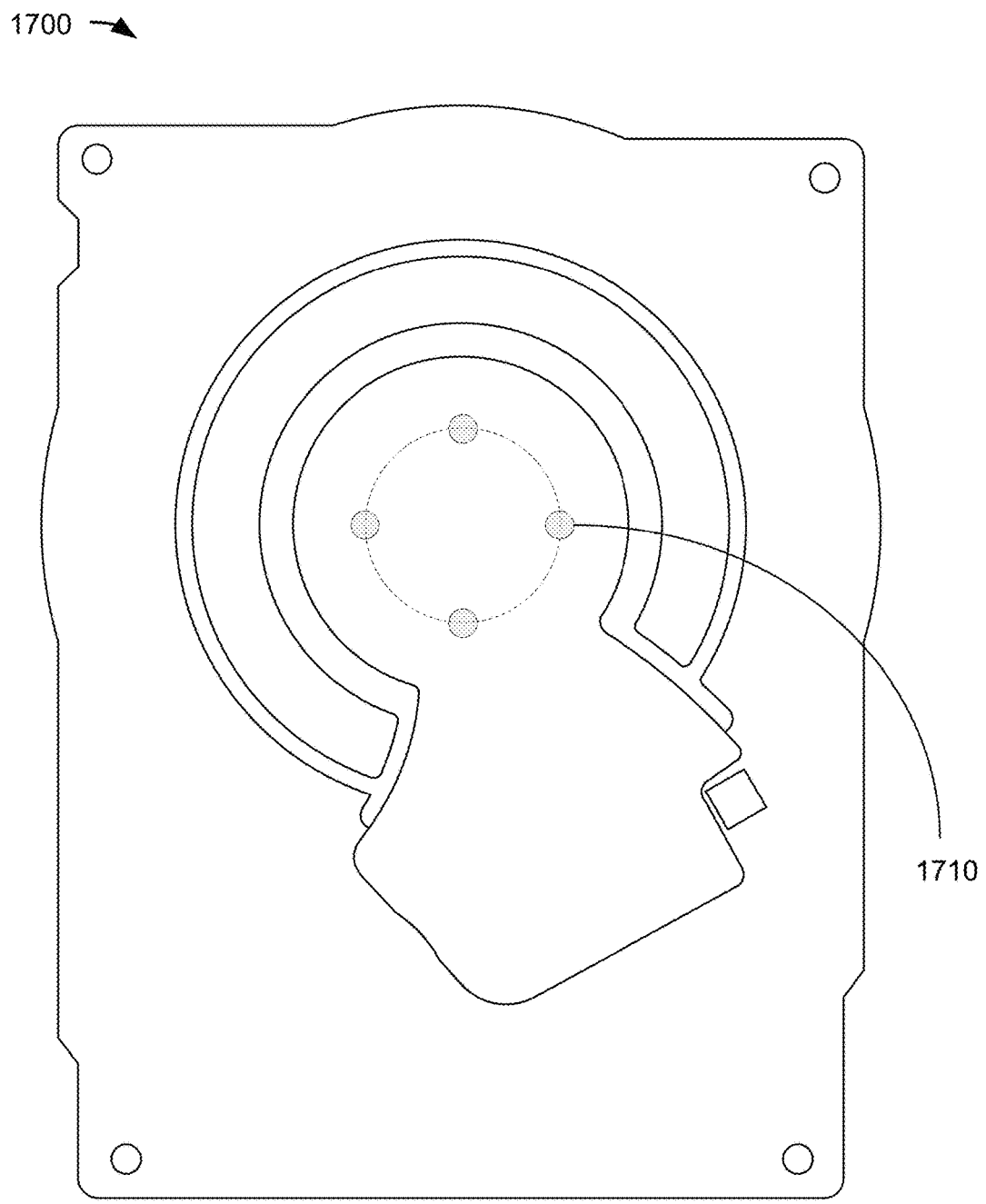
FIGS. 17A-17B show a drive cover with yet another profile according to one aspect of the present embodiments.
Figure 17B:
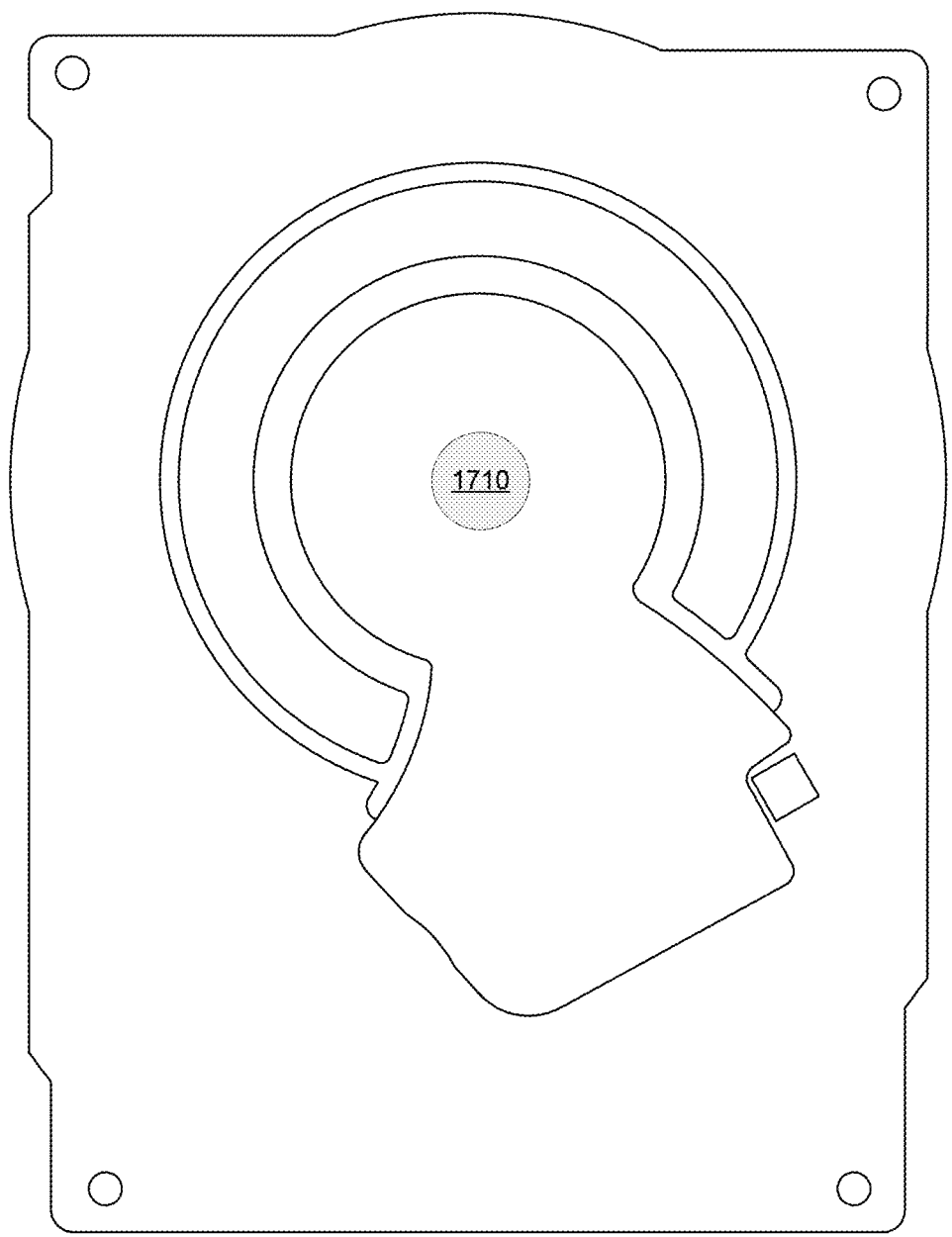
Figure 18:
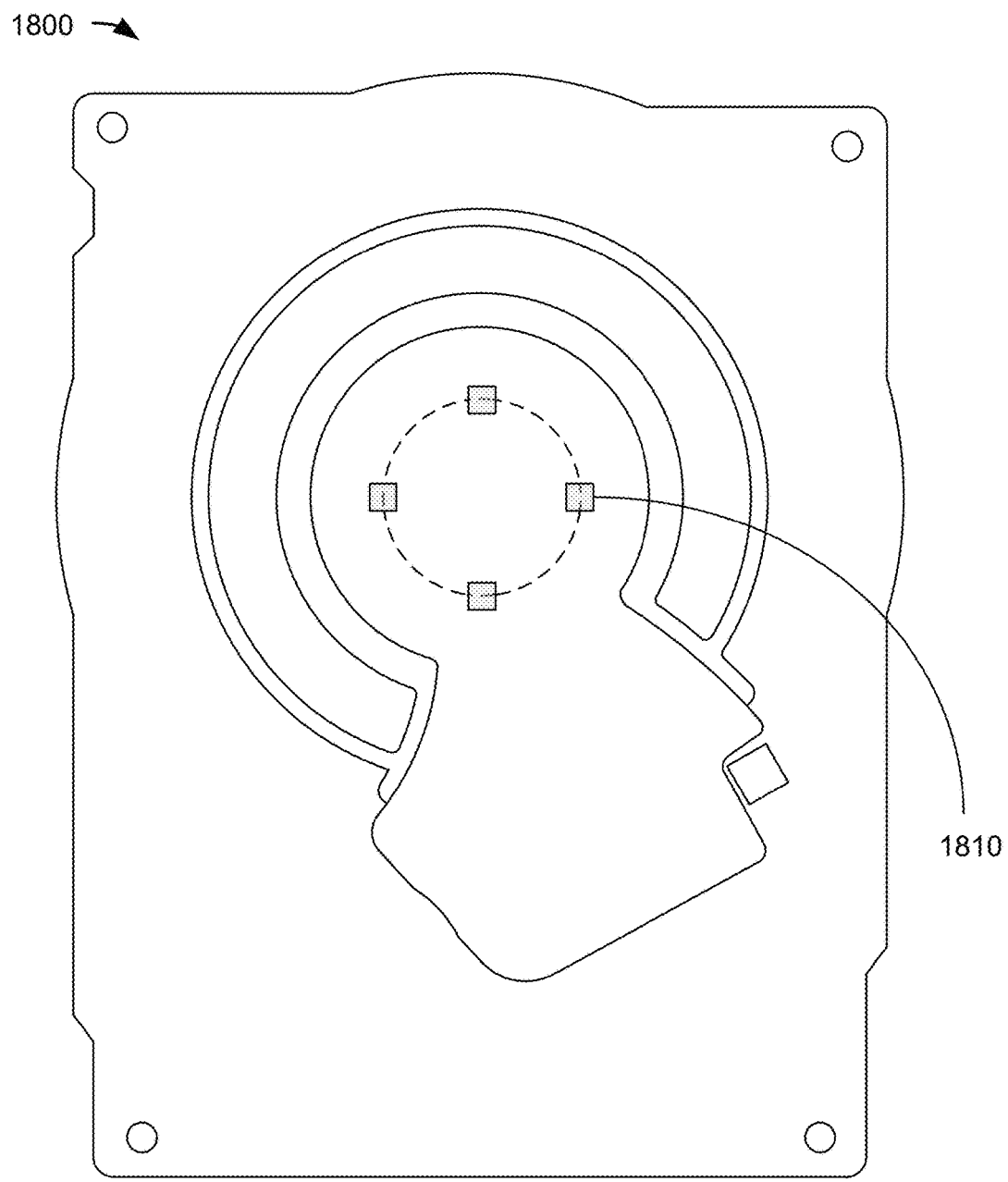
FIG. 18 shows a drive cover according to an alternate aspect of the present embodiments.

Referring now to FIGS. 17A-17B, a top and bottom view of a drive cover 1700 with yet another profile according to one aspect of the present embodiments is shown. FIG. 17A shows a top view of the drive cover including the snubber 1710 and FIG. 17B shows the bottom view of the drive cover 1700. The snubber 1710 may be similar to the snubbers described above but with a different profile. Referring now to FIG. 18, yet another top view of the drive cover 1800 with alternate profile according to one aspect of the resent embodiments is shown. The drive cover 1800 includes a snubber 1810. The snubber 1810 may be similar to the snubbers described above but with a different profile.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
   a drive base;
   a drive cover overlying the drive base, wherein the drive base and the drive cover enclose a media; and
   a snubber overmolded onto the drive cover, wherein
      a clamp assembly contacts the snubber during shock events; and
      the clamp assembly is selected from a group consisting of a disc clamp and a disc clamp screw.

2. The apparatus of claim 1, wherein the snubber is selected from a group of material comprising epoxy-based, elastomer materials, Teflon™, Polycarbonate, Polyoxymethylene, Polyetherimide, and Polypropylene.

3. The apparatus of claim 1 further comprising a seal deposited on an exterior portion of the drive cover that encloses the media, wherein the seal contacts the exterior portion of the drive cover and overlies the snubber to prevent leakage.

4. The apparatus of claim 1, wherein the snubber comprises a first portion and a second portion, wherein the first portion is positioned on an exterior portion of the drive cover that encloses the media and wherein the second portion is positioned in an interior portion of the drive cover that encloses the media and wherein the second portion contacts the clamp assembly during the shock events, and wherein the apparatus further comprises a seal disposed between the first portion of the snubber and the exterior portion of the drive cover.

5. An apparatus comprising:
   a drive base;
   a drive cover overlying the drive base, wherein the drive cover comprises an opening therein, and wherein the drive cover is coupled to the drive base to enclose a media within an interior of the apparatus;
   a disc clamp configured to secure the media to a motor;
   a first snubber portion positioned on an exterior of the apparatus on the disk cover, wherein the first snubber portion overlies the opening on one side of the opening, and wherein a width of the first snubber portion is greater than a gap of the opening; and
   a second snubber portion positioned on the interior of the apparatus and in contact with the disk cover, wherein the second snubber portion overlies the opening on another side of the opening, wherein the first snubber portion and the second snubber portion are coupled to the drive cover covering the opening, wherein the disc clamp contacts the second snubber portion during shock events.

6. The apparatus of claim 5, wherein the opening is circular in shape and wherein the gap is a diameter of the opening.

7. The apparatus of claim 5, wherein a width of the second snubber portion is greater than the gap of the opening, and wherein the first snubber portion and the second snubber portion are overmolded to the drive cover.

8. The apparatus of claim 5, wherein a width of the second snubber portion is the same as the gap of the opening, and wherein the apparatus further comprises fasteners that couple the first snubber portion to the drive cover.

9. The apparatus of claim 5, wherein the first snubber portion is selected from a group of material comprising epoxy-based, elastomer materials, Teflon™, Polycarbonate, Polyoxymethylene, Polyetherimide, and Polypropylene, and wherein the second snubber portion is selected from a group of material comprising epoxy-based, elastomer materials, Teflon™, Polycarbonate, Polyoxymethylene, Polyetherimide, and Polypropylene.

10. The apparatus of claim 1 further comprising a seal deposited on an exterior portion of the drive cover, wherein the seal contacts the exterior portion of the drive cover and overlies the first snubber portion to prevent leakage.

11. The apparatus of claim 5 further comprising a seal disposed between the first snubber portion and an exterior portion of the drive cover.

12. An apparatus comprising:
a drive base;
a drive cover overlying the drive base, wherein the drive cover comprises an opening therein, and wherein the drive cover is coupled to the drive base to enclose a media within an interior of the apparatus;
a disc clamp screw configured to secure a disc clamp to a motor;
a first snubber portion positioned on an exterior of the apparatus on the disk cover, wherein the first snubber portion overlies the opening on one side of the opening, and wherein a width of the first snubber portion is greater than a gap of the opening; and
a second snubber portion positioned on the interior of the apparatus and in contact with the disk cover, wherein the second snubber portion overlies the opening on another side of the opening, wherein the first snubber portion and the second snubber portion are coupled to the drive cover covering the opening, wherein the disc clamp screw contacts the second snubber portion during shock events.

13. The apparatus of claim 12, wherein the opening is circular in shape and wherein the gap is a diameter of the opening.

14. The apparatus of claim 12, wherein a width of the second snubber portion is greater than the gap of the opening, and wherein the first snubber portion and the second snubber portion are overmolded to the drive cover.

15. The apparatus of claim 12, wherein a width of the second snubber portion is the same as the gap of the opening, and wherein the apparatus further comprises fasteners that couple the first snubber portion to the drive cover.

16. The apparatus of claim 12, wherein the first snubber portion is selected from a group of material comprising epoxy-based, elastomer materials, Teflon™, Polycarbonate, Polyoxymethylene, Polyetherimide, and Polypropylene, and wherein the second snubber portion is selected from a group of material comprising epoxy-based, elastomer materials, Teflon™, Polycarbonate, Polyoxymethylene, Polyetherimide, and Polypropylene.

17. The apparatus of claim 12 further comprising a seal deposited on an exterior portion of the drive cover, wherein the seal contacts the exterior portion of the drive cover and overlies the first snubber portion to prevent leakage.

18. The apparatus of claim 12 further comprising a seal disposed between the first snubber portion and an exterior portion of the drive cover.

* * * * *